United States Patent
Allemann

(10) Patent No.: US 6,948,901 B2
(45) Date of Patent: Sep. 27, 2005

(54) PAPER ROLL STORAGE AND HANDLING INSTALLATION AND METHOD FOR STORING AND HANDLING PAPER ROLLS

(75) Inventor: Hugo Allemann, Bellmund (CH)

(73) Assignee: Metso Paper AG, Delemont (CH)

( * ) Notice: Subject to any disclaimer, the term of this patent is extended or adjusted under 35 U.S.C. 154(b) by 0 days.

(21) Appl. No.: 10/291,401

(22) Filed: Nov. 12, 2002

(65) Prior Publication Data

US 2004/0091340 A1 May 13, 2004

(51) Int. Cl.$^7$ .................................................. B65G 1/16
(52) U.S. Cl. ........................................ 414/279; 414/911
(58) Field of Search .......................... 414/277, 279–281, 414/911, 282

(56) References Cited

U.S. PATENT DOCUMENTS

| | | | |
|---|---|---|---|
| 3,499,554 A | | 3/1970 | Davis et al. |
| 3,746,189 A | | 7/1973 | Burch et al. |
| 3,995,752 A | | 12/1976 | Tamura et al. |
| 4,268,207 A | * | 5/1981 | Pipes .......................... 414/277 |
| 4,406,570 A | * | 9/1983 | Duncan et al. ............. 414/282 |
| 4,435,119 A | | 3/1984 | House |
| 4,752,176 A | | 6/1988 | Linder |
| 4,803,634 A | | 2/1989 | Ohno et al. |
| 4,863,335 A | | 9/1989 | Herigstad et al. |
| 4,993,906 A | | 2/1991 | Nisimura et al. |
| 5,076,751 A | | 12/1991 | Kafka |
| 5,085,377 A | * | 2/1992 | Rohrer et al. .............. 242/58.6 |
| 5,286,157 A | | 2/1994 | Vainio et al. |
| 5,388,955 A | * | 2/1995 | Schroder ..................... 414/279 |
| 6,155,516 A | * | 12/2000 | Lehrieder et al. ......... 242/559.3 |

FOREIGN PATENT DOCUMENTS

| | | |
|---|---|---|
| DE | 37 39 222 A1 | 5/1988 |
| DE | 37 39 234 A1 | 5/1988 |
| GB | 2181117 | 4/1987 |
| JP | A 63-209904 | 8/1988 |

OTHER PUBLICATIONS

Postpress Systems highLighted AT Print '01, Oct. 2001.*
Dayton Daily News shows off new facility to ING attendees, Nov. 2000.*
AWA brochure, "High–Rise Warehousing Systems", 1992.
Photos of AWA installation in Walki, Finland involving storage and handling of paper rolls in association with slitting/rewinding units.
Editor & Publisher, "Automating Newsprint Storage", Jul. 22, 1989.
Valmet Catalog, "Economic Roll Handling Solutions, Roll Handling", (date unknown).
Jervis B. Webb Company Catalog, 1987.

* cited by examiner

Primary Examiner—Thomas J. Brahan
(74) Attorney, Agent, or Firm—Oliff & Berridge, PLC

(57) ABSTRACT

In a storage and handling installation for paper rolls for a printing facility, a storage structure is provided with two parallel storage racks separated by an aisle. The first storage rack provides a series of floor strips interrupted by load stations as well as shelves, each shelf being situated above one of the floor strips. Floor strips and shelves each provide a plurality of storage locations for taking up paper rolls side by side with their axes horizontally oriented transversely to the aisle. The load stations can each take up a wagon transferable to a reelstand via a straight rail section. A storage and retrieval device is movable along the aisle and comprises a vertically movable platform with a support transversely extendable into the storage locations and load stations for taking up or deposing a single paper roll. The storage locations and the load stations are contained in a contiguous uninterrupted handling space such that the loaded storage and retrieval device can move along the aisle with extended support where the storage locations are unoccupied, whereby less time is consumed during roll delivery and reshuffling operations.

13 Claims, 4 Drawing Sheets

PAPER ROLL STORAGE AND HANDLING INSTALLATION AND METHOD FOR STORING AND HANDLING PAPER ROLLS

BACKGROUND OF THE INVENTION

1. Field of Invention

The invention relates to a paper storage and handling installation for paper rolls as used in a reelroom of a printing press facility. It further relates to a method of handling and storing paper rolls in a reelroom.

2. Description of Related Art

An installation for the storage of pallets (U.S. Pat. No. 3,746,189) is known where a storage structure comprising parallel storage racks separated by aisles are provided. Each storage rack comprises a sequence of equidistant parallel vertical front beams facing the aisle and further vertical beams spaced from the front beams in a direction transverse to the direction of the aisle. Pairs of horizontal transverse L-shaped supporting profiles are fixed to the sides of the beams to support individual pallets. A storage location is in each case delimited by sections of the vertical beams bounding the same laterally at the front and back ends and by the flanges of the L-shaped supporting profiles bounding them from below. Load stations are provided at the side of the aisle adjacent to the storage racks.

A storage and retrieval device comprises a base movable along the aisle and carrying a platform vertically movable along a mast. A support mounted on the platform is transversely extendable into the load stations and storage locations and retractable from the same. As the storage locations are bounded laterally at their front ends by the front beams it is necessary to retract the support before it can be laterally shifted from a first storage location to a second storage location, even if the latter is at the same level and adjacent to the first storage location. Each time a pallet is to be transferred the support must be retracted after taking it up and, after the base has been moved along the aisle, extended again before the pallet can be deposed. Considerable loss of time may ensue as the movement of the support, particularly when loaded with a heavy object, is usually rather slow, its velocity and acceleration being limited by mechanical and other constraints.

Otherwise similar installations which are suitable for the storage of paper rolls for printing, with axes oriented vertically and horizontally, respectively, have been proposed in DE-A-37,39,234 and DE-A-37,39,222. They suffer from similar constraints on the movement of the storage and retrieval device caused by elements separating consecutive storage locations. The same applies to an installation for the storage and handling of paper rolls described in U.S. Pat. No. 5,076,751 where storage racks are subdivided into individual bins separated by walls.

SUMMARY OF THE INVENTION

It is an object of the invention to provide an installation for the storage and handling of paper rolls, in particular in a reelroom of a printing facility, which provides for inproved, in particular faster, handling of the paper rolls. According to the invention, storage surfaces are provided which offer rows of consecutive storage locations contained in a contiguous uninterrupted handling space. The handling space is not subdivided in a way which might impede the movement of the support, i.e. the component of the storage and retrieval device which is in direct contact with the paper rolls while the same is in its extended state. As a consequence, paper rolls can be transferred from one storage location contained in the handling space to any other such storage location without transverse motions of the support, provided that any intervening storage locations are unoccupied. This allows in particular very fast reshufflings of the paper rolls in view of later delivery, usually transferring them from storage locations relatively far removed from a load station to nearer storage locations.

In a preferred embodiment, the contiguous uninterrupted handling space extends to at least one of several load stations in each case, such that transfer of a paper roll from any storage location in the handling space to the load station is also possible without transverse motions of the support, provided that any intervening storage locations are unoccupied.

In a further aspect of the invention, methods of storage and handling of paper rolls as described above are specifically proposed. The methods in question exploit the potential of the proposed installation for achieving fast and flawless delivery of paper rolls, in particular to the reelstands of a printing facility. It is an important feature of the methods in question that the support of the storage and retrieval device be maintained in an extended state while transferring a paper roll from a storage location to a different storage location or to a load station whenever this is feasible, thereby avoiding unnecessary and time consuming transverse motions for the support.

BRIEF DESCRIPTION OF THE DRAWINGS

In the following the invention is described with reference to figures that merely show exemplary embodiments.

DETAILED DESCRIPTION OF PREFERRED EMBODIMENTS

Figure 1:
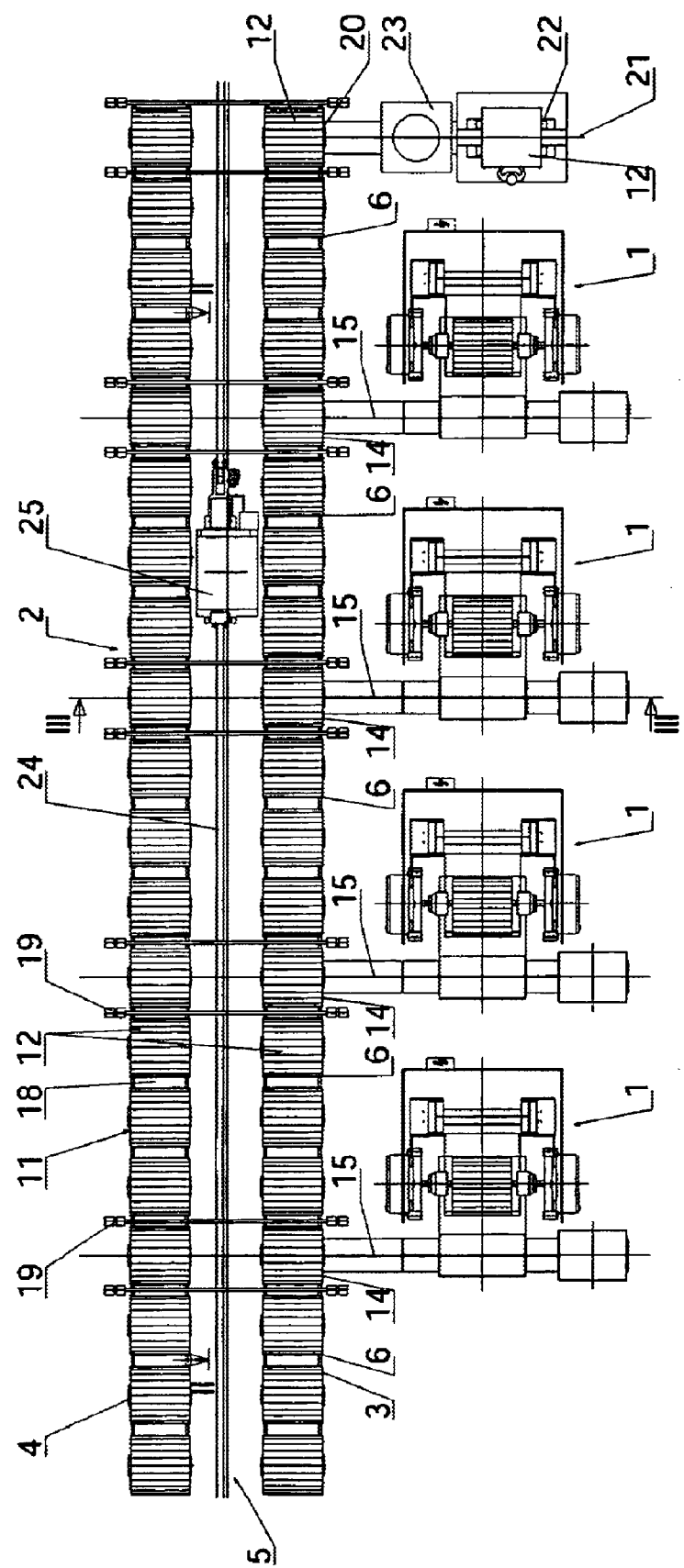
FIG. 1 is a plane view of a part of a reelroom with a row of reelstands and a storing and handling installation for paper rolls according to the invention.

In a reelroom of a printing facility, several reelstands 1 are aligned in a longitudinal direction, forming a row of reelstands. Parallel to the row of reelstands 1, but spaced from it in a transverse direction perpendicular to the longitudinal direction, a storage structure 2 for accommodating paper rolls is provided comprising a first storage rack 3 facing the row of reelstands 1 and a second storage rack 4 parallel to the first storage rack 3 and separated from it by an aisle 5.

Figure 2:
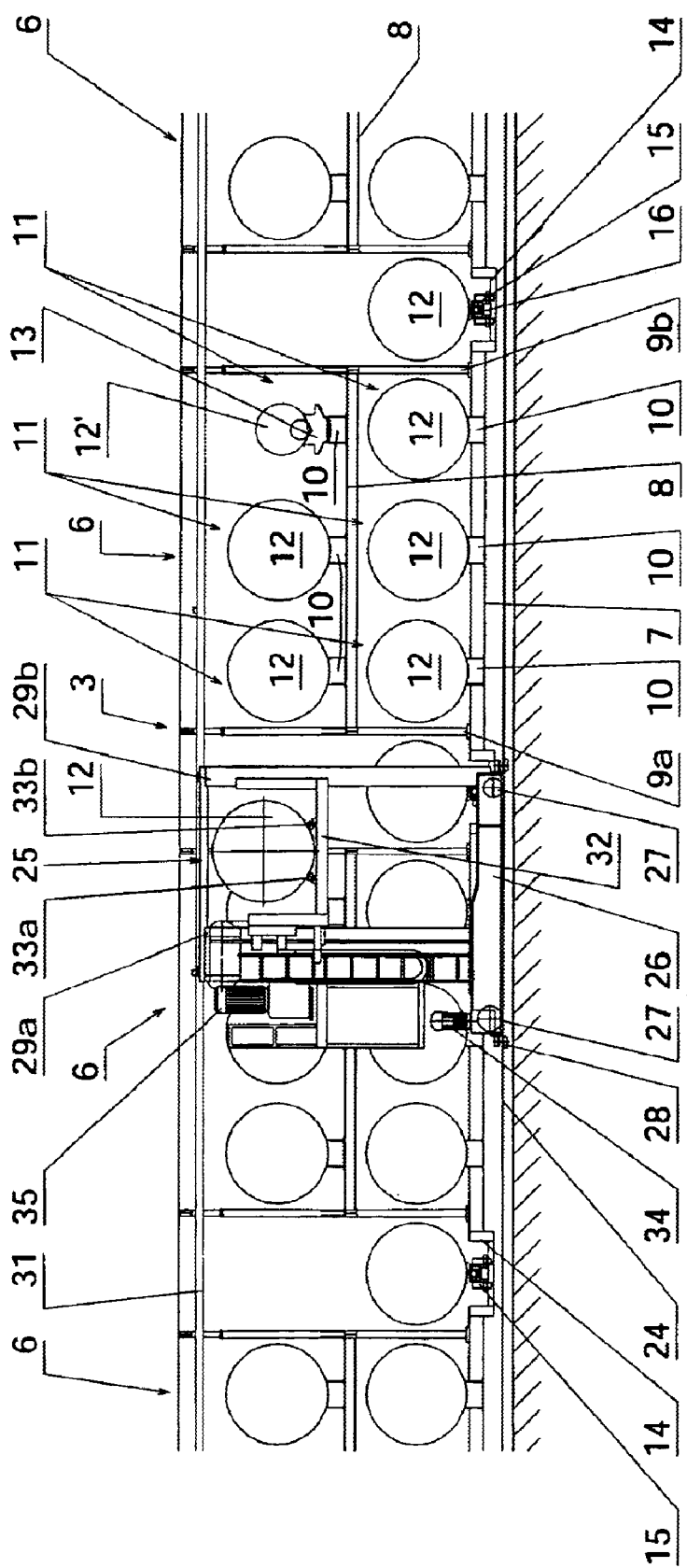
FIG. 2 is a partial longitudinal elevation taken substantially as indicated by the line II—II in FIG. 1.

The first storage rack 3 comprises a sequence of storage sections 6, each with a floor strip 7 (FIG. 2) serving as a first storage surface and a shelf 8 supported by lateral vertical beams 9*a,b* providing a second storage surface situated above the first storage surface and congruent with it. The vertical beams 9*a,b* are provided at the back of the first storage rack 3 facing away from the aisle 5. The first and second storage surfaces are each equipped with three equidistant roll supports 10 serving as a sequence of storage locations 11, each for accommodating a paper roll 12 with its axis oriented horizontally in the transverse direction. To accommodate a partially used-up roll 12', an adapter 13 can be employed which rests on the roll support 10.

Each of the storage locations 11 has a clear height sufficient for accommodating a paper roll 12 of a given maximum diameter and also for allowing the paper roll 12 to be lifted above the roll support 10 and moved sideways without its colliding with the rack structure. The maximum diameter also determines the maximum number of storage locations on a first or second storage surface, as the distance between the centers of subsequent paper rolls must, of course, be somewhat larger than the maximum diameter.

However, due to the continuous nature of the storage surfaces, if rolls of various maximum diameters are used at foreseeable rates, portions of the storage structure can be specifically adapted to those various maximum diameters. Also, the number of storage locations is easily adaptable to the maximum diameter or diameters of the paper rolls that are being used in the installation. If there is, e.g., a change from a type of paper roll used to a new type of smaller diameter, it is quite easy to subdivide respective storage surfaces into a higher number of storage locations, readjusting the positions of the roll supports and installing additional ones.

Figure 4:
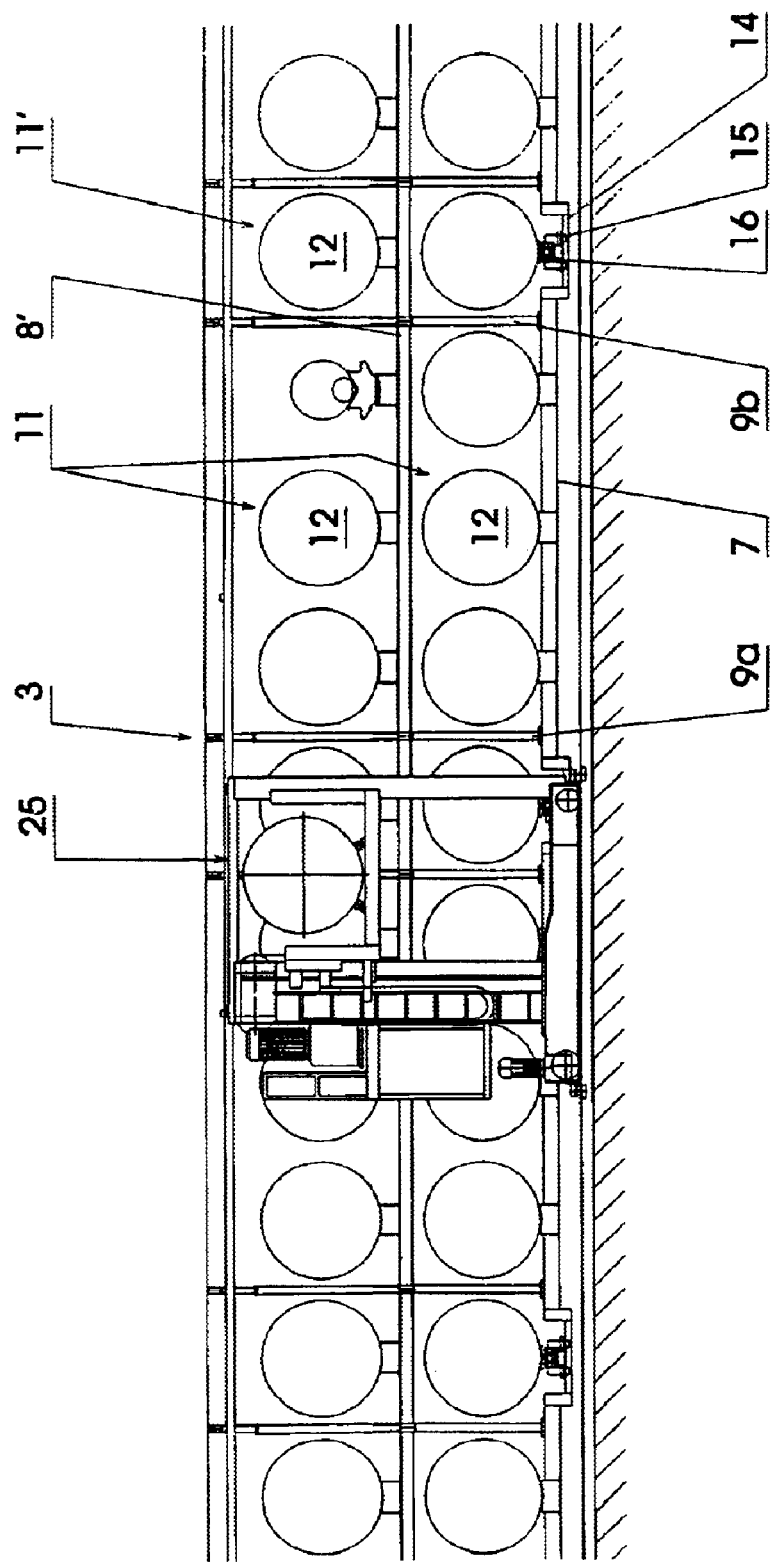
FIG. 4 is a partial longitudinal elevation, analogous to FIG. 2, of a slightly modified embodiment of the installation according to the invention.

Between two consecutive storage sections 6, a load station 14 facing one of the reelstands 1 is provided in each case. A short straight rail section 15 extends from the reelstand 1 into the load station 14 in a transverse direction. A transport device 16, e.g., a wagon, etc., serves to receive a single paper roll 12 with its axis oriented in the transverse direction at the load station 14 and transport the same via the rail 15 from the load station 14 to the reelstand 1 where it is taken up by the same. The shelves 8 of two consecutive storage sections 6 are separated by a gap above the load station 14. In this way, the storage locations 11 on the shelves 8 are, just as the ones on the floor strips 7, contained in a contiguous uninterrupted handling space that additionally contains the load stations 14. It is, however, equally possible to install a shelf 8' (FIG. 4) running along the whole length of the first storage rack 3 and providing a continuous second storage surface in order to gain an additional storage location 11' above each load station 14. Further load stations can be provided at either end of the first storage rack, adjacent to one of the first storage surfaces in the longitudinal direction.

More modifications to the first storage rack 3 as described above are, of course, possible. For example, the first storage rack could be subdivided by a supporting beam at the front adjacent to the aisle, in such a way that each contiguous uninterrupted handling space would merely contain a single load station as well as a plurality of storage locations, preferably distributed symmetrically to the load station, and suitable for taking up the paper rolls which are expected to be delivered there.

Figure 3:
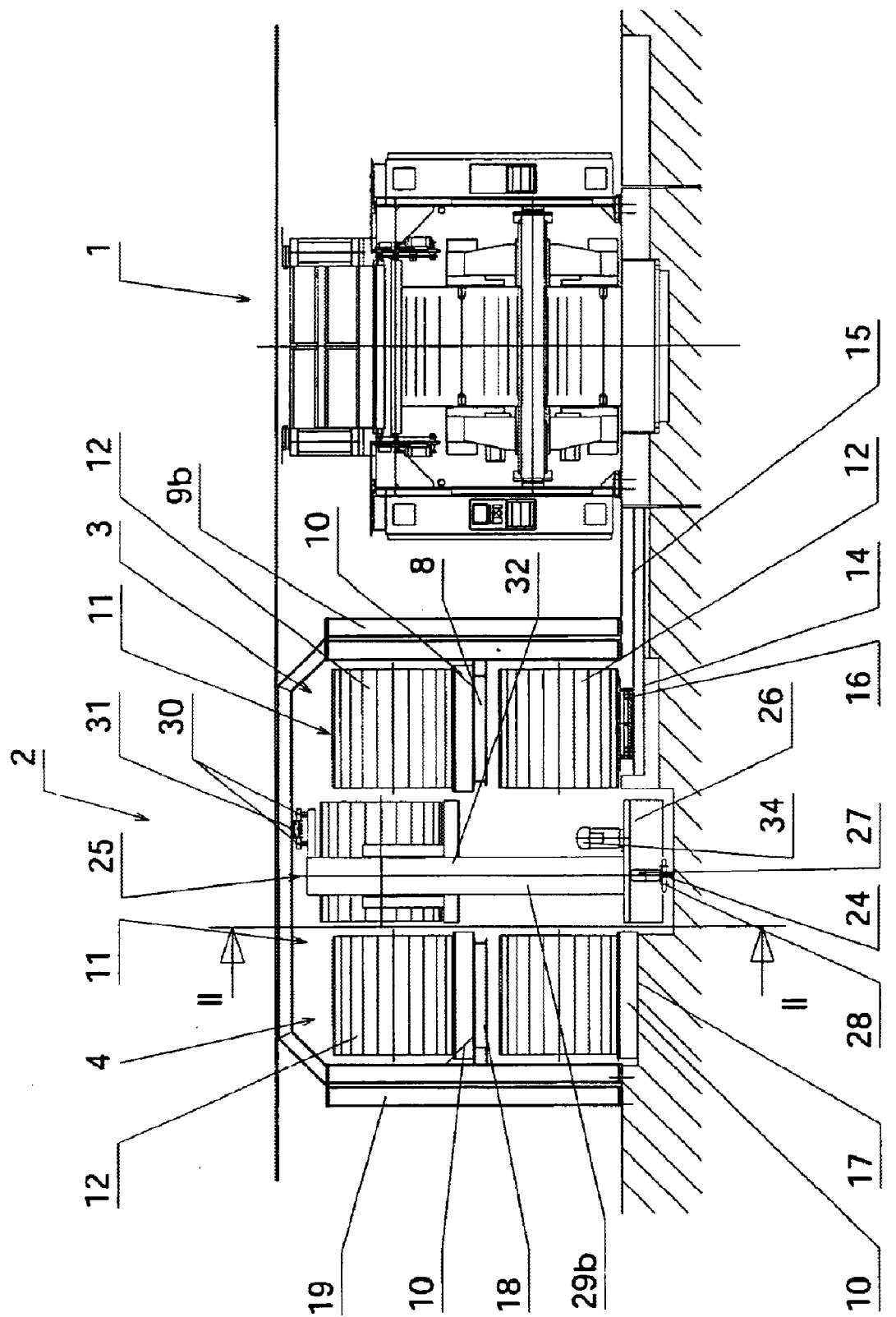
FIG. 3 is a transverse elevation taken as indicated by the line III—III in FIG. 1.

The second storage rack 4 is of a similar construction as the first one. A floor strip 17 (FIG. 3) provides a third storage surface that runs uninterruptedly along the whole length of the second storage rack 4. A shelf 18 situated opposite the shelves 8 of the first storage rack 3 also runs along the whole length of the second storage rack 4, thereby providing an uninterrupted fourth storage surface congruent with the third storage surface. Equidistant roll supports are positioned along the third and fourth storage surfaces. The shelf 18 is also supported exclusively by vertical beams 19 at the back of the second storage rack 4 facing away from the aisle 5. As a consequence, the space above the third and the fourth storage surfaces each forms a contiguous uninterrupted handling space with unseparated storage locations 11.

However, it is of course possible to modify this layout, e.g., by providing beams supporting the shelf at the front facing the aisle subdividing the third storage surface into several handling spaces each containing, e.g., three or four storage locations. It is also possible to divide the shelf into several sections separated by gaps, thereby providing a sequence of aligned fourth storage surfaces.

Alternatively, a second row of reelstands can be provided at the side of the storage structure opposite the first row of reelstands. In this case, the second storage rack will preferably be of essentially the same construction as the first storage rack, with a load station opposite each reelstand and a rail section connecting them. The first and second storage racks can, of course, each comprise more than one shelf. The number of shelves is only limited by the height of the room.

Adjacent to one end of the first storage rack 3 in the longitudinal direction, a pick-up station 20 is provided which can also accommodate a transport device, e.g., a wagon, for paper rolls 12. A straight rail section 21 leads from a storage facility (not shown) via a preparation station 22 where the paper rolls 12 are unpacked and prepared for reel change by the application of an adhesive tape and further via a turntable 23 where the paper roll 12 can be turned by 180° to adjust the unwinding direction where necessary, into the pick-up station 20 which is generally of equal or similar construction as the load stations 14.

A support rail 24 extending along the bottom of the aisle 5 is provided for guiding a storage and retrieval device 25 with a base 26 resting on support wheels 27 running on the upper surface of support rail 24 and stabilized by lower guiding wheels 28 interacting with the lateral surfaces of support rail 24. The base 26 carries an elevator comprising two masts 29a,b spaced from each other in the longitudinal direction and carrying upper guiding wheels 30 interacting with lateral surfaces of a guiding rail 31 which runs parallel to the support rail 24 at the top end of the aisle 5 and further a platform 32 vertically movably suspended between the masts 29a,b. The platform 32 carries a transversely extendable support suitable for taking up a single paper roll 12. It comprises two parallel arms 33a,b spaced from each other in the longitudinal direction which are insertable into the pick-up station 20 and the load stations 14 as well as into the storage locations 11 on both sides of the aisle 5 and retractable from the same. The support can, in its extended state, even when loaded with a paper roll of maximum diameter, be moved through any contiguous uninterrupted handling space of the storage structure 2 where the storage locations 11 are unoccupied.

A first motor 34 acting on a pinion engaging with a rack which extends along the support rail (not shown) is provided for moving the base 26 along the aisle 5 in the longitudinal direction whereas a second motor 35 lifts and lowers the platform 32 via steel cables (not shown). The transversal motion of the support can be driven by pneumatic cylinders or by a third motor via a rack and pinion gear.

The installation is usually controlled by a CPU that administrates the storage facility and processes roll delivery requests from the reelstands 1 and roll storage requests from the pick-up station 20.

With the storage and handling installation as described above several operations can be carried out as will be described below.

Storing

A paper roll 12 is brought to the preparation station 22 by a wagon via rail section 21, lifted from the wagon, unpacked and prepared, lowered onto the wagon and the latter transferred into the pick-up station 20. The storage and retrieval device 25 moves along the aisle 5 with the platform 32 in its lowered position and the support retracted until it is positioned opposite the pick-up station 20. Now the support is extended and inserted into the same, its arms 33*a,b* extending below the paper roll 12 alongside the same on both sides of the wagon. Now the platform 32 is lifted slightly, the arms 33*a,b* take up the paper roll 12 whereupon they are retracted such that the storage and retrieval device 25 loaded with the paper roll 12 does not transversely extend beyond the boundaries of the aisle 5.

Subsequently, the base 26 of the storage and retrieval device 25 is moved to the longitudinal position of a predetermined empty storage location 11 where the paper roll 12 is to be stored. Now the elevation of the platform 32 is, where necessary, adjusted until the support is positioned slightly above the roll support 10 of the storage location 11. Then it is extended into the same and the platform 32 lowered and the paper roll 12 deposed on the roll support 10. If the pick-up station 20 is not separated from the predetermined storage location 11, i.e., if it is contained in the same contiguous uninterrupted handling space as the latter and if any intervening storage locations 11 are unoccupied, the retraction and extension of the support 32 can be omitted and the storage and retrieval device 25 moved along the aisle 5 with the support remaining in its extended state. This may speed up the operation considerably. However, storing is usually not particularly critical as to time in that it is usually carried out while the printing facility is not operative. Also, the preparation of a paper roll 12 usually takes longest and determines the time consumed.

Retrieval and Delivery

If a paper roll 12 is requested at one of the reelstands 1 the storage and retrieval device 25 is directed to a storage location 11 where a paper roll 12 of the required quality is stored. If there are several eligible storage locations 11, the one closest to the load station 14 opposite the requesting reelstand 1 will usually be selected. The support is again extended, the platform 32 slightly raised and the paper roll 12 thereby lifted from the roll support 10. If the storage location 11 and the load station 14 are both contained in the same contiguous uninterrupted handling space, as explained above, and provided that any intervening storage location 11 is unoccupied, the paper roll 12 can now be transferred to the load station 14 and deposed on the wagon 15 quickly and without time consuming retraction and extension of the support.

This applies as well if the storage location 11 is on one of the second storage surfaces, i.e., on the shelf 8, because the storage and retrieval device 25 can move along the aisle 5 with the platform 32 above the level of the shelf 8 and the support 32 and paper roll 12 then lowered through the gap above the load station 14. After the paper roll 12 has been deposed the support is retracted. As roll delivery is critical as to the time consumed—late delivery of a paper roll 12 is extremely disruptive of the printing process—the achieved reduction of delivery time is of great value.

If the load station 14 and the storage location 11 in question do not belong to the same contiguous uninterrupted handling space—being separated, e.g., by a supporting beam at the side of the first storage rack facing the aisle—the support will have to be retracted and extended again. The same operation will become necessary if the storage location in question is on the second storage rack 4. As is apparent from the described embodiment, it is usually possible to avoid any separations between consecutive storage locations 11 or between storage locations 11 and load stations 14 or even the pick-up station 20, the first and second storage surfaces being contained in a single contiguous uninterrupted handling space which also contains the load stations 14 and the pick-up station 20, whereas the third and fourth storage surfaces are each contained in a separate single contiguous uninterrupted handling space.

Reshuffling

Another circumstance which may make a retraction and subsequent extension of the support necessary even where storage location 11 and load station 14 are contained in the same contiguous uninterrupted handling space occurs if an intervening storage location 11 is occupied. This can, however, be avoided in many cases if, during periods when the storage and retrieval device 25 would otherwise be idle, reshuffling operations are carried out. During such periods, paper rolls 12 which will foreseeably or likely be needed at a certain reelstand can be relocated to a storage location 11 close to the load station 14 opposite said reelstand 1, thereby decreasing the probability of occupied intervening storage locations between the storage location containing a requested paper roll and the load station where the paper roll is to be delivered.

Travel time of the storage and retrieval device is, of course, also reduced if paper rolls 12 are systematically shifted closer to the load stations 14 during periods where the storage and retrieval device 25 would otherwise be idle. If a paper roll 12 from a storage location 11 adjacent to a load station 14 has been delivered and the storage location emptied, the paper roll in the next storage location on the same storage surface can be taken up by the storage and retrieval device 25 and transferred to the storage location 11 adjacent the load station 14 etc. As the storage locations belong to the same contiguous uninterrupted handling space, the reshuffling process will usually not require retraction and extension of the support during roll transfer apart from take-up and deposition. At delivery, the required paper roll will usually be very close, even adjacent, to the load station 14, consequently the storage and retrieval device 25 will have to travel a very short way only when loaded with the paper roll and the operation will require only a minimum amount of time. Reshuffling operations as explained are useful even where the load stations are separated from the storage locations and not contained in the same contiguous uninterrupted handling space, e.g., if they are contained in the second storage rack 4.

What is claimed is:

1. A paper roll storage and handling installation comprising:

a storage structure comprising a sequence of aligned first storage surfaces and at least one second storage surface, each of the storage surfaces extending horizontally along a longitudinal direction and providing a plurality of storage locations for paper rolls placed side by side with axes horizontally oriented in a transverse direction perpendicular to said longitudinal direction, a plurality of load stations aligned with the sequence of first storage surfaces, each of them situated adjacent to one of the first storage surfaces in the longitudinal direction or between two consecutive first storage surfaces, for accommodating a transport device suitable for receiving a single paper roll with its axis oriented in the transverse direction, the transport device being movable away from the load station in the transverse direction to a first side of the first and second storage surfaces, an aisle extending alongside the sequence of first storage surfaces and the plurality of load stations in the longitudinal direction at a side of the first and second storage surfaces opposite said first side, a pick-up station situated adjacent the aisle in the transverse direction for receiving a single paper roll with its axis oriented in the transverse direction, a storage and retrieval device for transferring paper rolls between the pick-up station, the load stations and the storage locations, the storage and retrieval device comprising a base movable along the aisle in the longitudinal direction, a vertically movable platform mounted on the base and a support for carrying a single paper roll mounted on the platform, the support being transversely extendable from the aisle into the pick-up station, any of the load stations and any of the storage locations and retractable from the same, wherein the at least one second storage surface is situated above the first storage surfaces, wherein a plurality of storage locations of both at least one of the first storage surfaces and at least one of the at least one second storage surface are contained in a same contiguous handling space, the same contiguous handling space also including at least one load station that is situated adjacent a storage location of the first storage surfaces contained in the same contiguous handling space, and wherein the at least one second storage surface is bordered by at least one gap that is also within the same contiguous handling space such that the support is movable vertically, through the at least one gap, between a level of the at least one first storage surfaces and a level of the at least one second storage surface in its extended state whenever any load station or storage location of the at least one first storage surfaces that is vertically aligned with the gap is unoccupied.

2. The paper roll storage and handling installation of claim 1, suitable for the storing and handling of paper rolls having diameters up to a maximum diameter, wherein a height of the same contiguous handling space is greater than the maximum diameter throughout, such that the support is movable from any of the storage locations of the handling space to any other of the storage locations of the handling space in its extended state, carrying a paper roll of maximum diameter, whenever any intervening storage location or load station is unoccupied.

3. The paper roll storage and handling installation of claim 1, wherein the load stations are spaced in the longitudinal direction, with one of the first storage surfaces and one of the at least one second storage surfaces congruent with the first storage surface provided between a first and a second of two consecutive load stations in each case.

4. The paper roll storage and handling installation of claim 3, wherein the first storage surface and the second storage surface each consist of at most a first plurality of consecutive storage locations contained in a first contiguous handling space which also contains the first load station and a second plurality of consecutive storage locations contained in a second contiguous handling space which also contains the second load station.

5. The paper roll storage and handling installation of claim 3, wherein the first storage surface and the second storage surface each consist of a single plurality of consecutive storage locations contained in a contiguous handling space which also contains the first load station and the second load station.

6. The paper roll storage and handling installation of claim 1, wherein the at least one gap in the at least one second storage surface is situated above one of the at least one load stations.

7. The paper roll storage and handling installation of claim 1, the storage structure additionally providing at least one third storage surface and one fourth storage surface extending horizontally in the longitudinal direction at the side of the aisle opposite the first and second storage surfaces, and each providing a plurality of storage locations for paper rolls placed side by side with axes horizontally oriented in the transverse direction and where the fourth storage surface is situated above the third storage surface.

8. The paper roll storage and handling installation according to claim 1, wherein each of the storage locations is equipped with a roll support for taking up a paper roll.

9. The paper roll storage and handling installation of claim 1, wherein the contiguous handling space includes at least one uninterrupted passage therethrough in which the support is movable in its extended state if storage locations or load stations in the uninterrupted passage are unoccupied, the support being movable vertically in its extended state between the level of the at least one of the first storage surfaces and the level of the at least one second storage surface through the at least one gap such that the uninterrupted passage may include a passage between storage locations, or between a storage location and a load station, located on different levels of the storage structure.

10. A paper roll storage and handling installation in a reelroom with a row of reelstands aligned in a longitudinal direction, the installation comprising:

a storage structure providing a sequence of aligned first storage surfaces and at least one second storage surface, each of the storage surfaces extending horizontally along a longitudinal direction and providing a plurality of storage locations for paper rolls placed side by side with axes horizontally oriented in a transverse direction perpendicular to said longitudinal direction, a plurality of load stations aligned with the sequence of first storage surfaces, each of them situated adjacent to one of the first storage surfaces in the longitudinal direction or between two consecutive first storage surfaces, for accommodating a transport device suitable for receiving a single paper roll with its axis oriented in the transverse direction, a plurality of straight rail sections, each rail section extending in the transverse direction from one of the load stations to one of reelstands, for guiding the transport device, an aisle extending alongside the sequence of first storage surfaces and the plurality of load stations in the longitudinal direction at a side of the first and second storage surfaces, a pick-up station situated adjacent the aisle in the transverse direction for receiving a single paper roll with its axis oriented in the transverse direction, a storage and retrieval device for transferring paper rolls between the pick-up station, the load stations and the storage locations, the storage and retrieval device comprising a base movable along the aisle in the longitudinal direction, a vertically movable platform mounted on the base and a support for carrying a single paper roll mounted on the platform, the support being transversely extendable from the aisle into the pick-up station, any of the load stations and any of the storage locations and retractable from the same, wherein the at least one second storage surface is situated above the first storage surfaces, wherein a plurality of storage locations of the first and second storage surfaces as well as at least one load station are contained in a same contiguous handling space, and wherein the at least one second storage surface is bordered by at least one gap that is also within the same contiguous handling space such that the support is movable vertically, through the at least one gap, between a level of the at least one first storage surfaces and a level of the at least one second storage surface in its extended state whenever any load station or storage location of the at least one first storage surfaces that is vertically aligned with the gap is unoccupied.

11. A method for storing and handling paper rolls in a reelroom with a row of reelstands aligned in a longitudinal direction, comprising:

providing
   a) a storage structure comprising a sequence of aligned first storage surfaces and at least one second storage surface, each of the storage surfaces extending horizontally along a longitudinal direction and providing a plurality of storage locations for paper rolls placed side by side with axes horizontally oriented in a transverse direction perpendicular to said longitudinal direction,
   b) a plurality of load stations aligned with the sequence of first storage surfaces, each of them situated adjacent to one of the first storage surfaces in the longitudinal direction or between two consecutive first storage surfaces, for accommodating a transport device suitable for receiving a single paper roll with its axis oriented in the transverse direction,
   c) a plurality of straight rail sections, each rail section extending in the transverse direction from one of the load stations to one of reelstands, for guiding the transport device,
   d) an aisle extending alongside the sequence of first storage surfaces and the plurality of load stations in the longitudinal direction at a side of the first and second storage surfaces,
   e) a pick-up station situated adjacent the aisle in the transverse direction for receiving a single paper roll with its axis oriented in the transverse direction, and
   f) a storage and retrieval device for transferring paper rolls between the pick-up station, the load stations and the storage locations, comprising a support movable along the aisle in the longitudinal direction and vertically for carrying a single paper roll, the support being transversely extendable from the aisle into the pick-up station, any of the load stations and any of the storage locations and retractable from the same, wherein the at least one second storage surface is situated above the first storage surfaces, wherein a plurality of storage locations of the first and second storage surfaces are contained in a same contiguous handling space, and wherein the at least one second storage surface is bordered by at least one gap that is also within the same contiguous handling space such that the support is movable vertically, through the at least one gap, between a level of the at least one first storage surfaces and a level of the at least one second storage surface in its extended state whenever any storage location of the at least one first storage surfaces that is vertically aligned with the gap is unoccupied, taking up a paper roll at a first storage location comprised in a contiguous handling space by means of the extended support of the storage and retrieval device, moving the support to a second storage location comprised in the same contiguous handling space as the first storage location with the support remaining in its extended state, and depositing the paper roll in the second storage location.

12. The method of claim 11, where the second storage location is closer to one of the load stations than the first storage location.

13. A method for storing and handling paper rolls in a reelroom with a row of reelstands aligned in a longitudinal direction, comprising:

providing
   a) a storage structure comprising a sequence of aligned first storage surfaces and at least one second storage surface, each of the storage surfaces extending horizontally along a longitudinal direction and providing a plurality of storage locations for paper rolls placed side by side with axes horizontally oriented in a transverse direction perpendicular to said longitudinal direction,
   b) a plurality of load stations aligned with the sequence of first storage surface, each of them situated adjacent to one of the first storage surfaces in the longitudinal direction or between two consecutive first storage surfaces, for accommodating a transport device suitable for receiving a single paper roll with its axis oriented in the transverse direction, the transport device being movable away from the load station in the transverse direction to a first side of the first and second storage surfaces,
   c) a plurality of straight rail sections, each rail section extending in the transverse direction from one of the lead stations to one of reelstands, for guiding the transport device,
   d) an aisle extending alongside the sequence of first storage surfaces and the plurality of load stations in the longitudinal direction at a side of the first and second storage surfaces opposite said first side,
   e) a pick-up station situated adjacent the aisle in the transverse direction for receiving a single paper roll with its axis oriented in the transverse direction, and
   f) a storage and retrieval device for transferring paper rolls between the pick-up station, the load stations and the storage locations, comprising a support movable along the aisle in the longitudinal direction and vertically for carrying a single paper roll, the support being transversely extendable from the aisle into the pick-up station, any of the load stations and any of the storage locations and retractable from the same, wherein the at least one second storage surface is situated above the first storage surfaces, wherein a plurality of storage locations of the first and second storage surfaces are contained, together with at least one load station, in a same contiguous handling space, and wherein the at least one second storage surface is bordered by at least one gap that is also within the same contiguous handling space such that the support is movable vertically, through the at least one gap, between a level of the at least one first storage surfaces and a level of the at least one second storage surface in its extended state whenever any load station or storage location of the at least one first storage surfaces that is vertically aligned with the gap is unoccupied, taking up a paper roll at a storage location comprised in the same contiguous handling space by means of the extended support of the storage and retrieval device, moving the support to the at least one load station comprised in the same contiguous handling space with the support remaining in its extended state, and depositing the paper roll on a transport device in the at least one load station.

* * * * *